United States Patent [19]

Hanson

[11] Patent Number: 4,790,143

[45] Date of Patent: Dec. 13, 1988

[54] METHOD AND APPARATUS FOR MONITORING A TRANSPORT REFRIGERATION SYSTEM AND ITS CONDITIONED LOAD

[75] Inventor: Jay L. Hanson, Bloomington, Minn.

[73] Assignee: Thermo King Corporation, Minneapolis, Minn.

[21] Appl. No.: 111,910

[22] Filed: Oct. 23, 1987

[51] Int. Cl.$^4$ .......................... F25B 49/00; F25B 13/00
[52] U.S. Cl. .......................................... 62/126; 62/129; 62/158; 62/160; 62/127
[58] Field of Search ................. 62/126, 125, 127, 129, 62/130, 160, 155, 157, 158, 208, 209, 229

[56] References Cited

U.S. PATENT DOCUMENTS

| | | |
|---|---|---|
| 2,049,413 | 8/1936 | Cannon . |
| 3,159,982 | 12/1964 | Schachner . |
| 3,257,819 | 6/1966 | Maloney . |
| 3,839,878 | 10/1974 | Tilmanis . |
| 3,899,895 | 8/1975 | Blanton et al. . |
| 4,187,093 | 2/1980 | Boratgis et al. . |
| 4,211,089 | 7/1980 | Mueller et al. ........................ 62/126 |
| 4,220,010 | 9/1980 | Mueller et al. ........................ 62/126 |
| 4,301,661 | 11/1981 | Krewson, Jr. . |
| 4,325,224 | 4/1982 | Howland . |
| 4,387,368 | 6/1983 | Day, III et al. . |
| 4,395,886 | 8/1983 | Mayer . |
| 4,527,399 | 7/1985 | Lord . |
| 4,677,830 | 7/1987 | Sumikawa et al. . |

FOREIGN PATENT DOCUMENTS

| | | |
|---|---|---|
| 104872 | 4/1984 | European Pat. Off. . |
| 158581 | 10/1985 | European Pat. Off. . |
| 153139 | 9/1982 | Japan ........................... 62/130 |
| 6341 | 1/1983 | Japan . |
| 022515 | 10/1985 | Japan . |

Primary Examiner—Harry B. Tanner
Attorney, Agent, or Firm—D. R. Lackey

[57] ABSTRACT

A method and apparatus for monitoring and protecting a transport refrigeration system, and a load in a load space to be conditioned by the transport refrigeration system. The temperature of the air discharged by the transport refrigeration system into the load space is compared with the returning air temperature to provide a signal D responsive to the algebraic difference. Signal D, which represents the actual conditioning mode, is compared with the commanded conditioning mode of the transport refrigeration system, and also with reference values selected according to whether or not the selected set point temperature of the load space is above or below a predetermined heat lock out temperature, to detect improper operating modes and other malfunctions of the transport refrigeration system, as well as insufficient refrigerant charge. First and second timers initiate first and second consecutive resettable time delays in response to such detections, after which warning and shut-down signals are respectively provided when the first and second resettable time delays are allowed to expire.

18 Claims, 4 Drawing Sheets

| MSB IN 9 | IN 8 | IN 7 | IN 6 | IN 5 | | | LSB | BIT # | D | V7 |
|---|---|---|---|---|---|---|---|---|---|---|
| 0 | 0 | 0 | 0 | 0 | 0 | 0 | 0 | 0 | | .48 VCC |
| 0 | 1 | 0 | 1 | 1 | 1 | 1 | 1 | 95 | | |
| 0 | 1 | 1 | 0 | 0 | 0 | 0 | 0 | 96 | −6.8°F | |
| 0 | 1 | 1 | 0 | 1 | 1 | 1 | 1 | 111 | | |
| 0 | 1 | 1 | 1 | 0 | 0 | 0 | 0 | 112 | −3.4°F | |
| 0 | 1 | 1 | 1 | 0 | 1 | 1 | 1 | 119 | | |
| 0 | 1 | 1 | 1 | 1 | 0 | 0 | 0 | 120 | −1.7°F | |
| 0 | 1 | 1 | 1 | 1 | 1 | 1 | 1 | 127 | | |
| 1 | 0 | 0 | 0 | 0 | 0 | 0 | 0 | 128 | 0°F | .5 VCC |
| 1 | 0 | 0 | 0 | 0 | 1 | 1 | 1 | 135 | | |
| 1 | 0 | 0 | 0 | 1 | 0 | 0 | 0 | 136 | +1.7°F | |
| 1 | 0 | 0 | 0 | 1 | 1 | 1 | 1 | 143 | | |
| 1 | 0 | 0 | 1 | 0 | 0 | 0 | 0 | 144 | +3.4°F | |
| 1 | 0 | 0 | 1 | 1 | 1 | 1 | 1 | 159 | | |
| 1 | 0 | 1 | 0 | 0 | 0 | 0 | 0 | 160 | +6.8°F | |
| 1 | 1 | 1 | 1 | 1 | 1 | 1 | 1 | 256 | | .52 VCC |

COOL ↑ / HEAT ↓

FIG. 3

| FIG. 4 | WARNING INDICATOR REFERENCE V1 | SHUT-DOWN REFERENCE V2 |
|---|---|---|
| HEAT NOT LOCKED OUT (L = 0) | 6.8 | 3.4 |
| HEAT LOCKED OUT (L = 1) | 3.4 | 1.7 |

METHOD AND APPARATUS FOR MONITORING A TRANSPORT REFRIGERATION SYSTEM AND ITS CONDITIONED LOAD

BACKGROUND OF THE INVENTION

1. Field of the Invention

The invention relates in general to transport refrigeration systems, such as refrigeration systems for trucks, trailers and containers, and more specifically to methods and apparatus for monitoring and protecting transport refrigeration systems.

2. Description of the Prior Art

Transport refrigeration systems condition a load space to a selected set point temperature, with the set point temperature being selected according to the nature of the load in the cargo space. For example, the load may be a frozen load, in which case the selected set point temperature will be below 15 degrees F., or it may be a perishable load having a selected set point temperature which is normally above freezing.

When the selected set point temperature is above a predetermined temperature, called the heat lock-out temperature, which may be 15 degrees F., for example, the transport refrigeration system controls the temperature of the load space to the selected set point by heating and cooling modes or cycles. When the selected set point is at or below the heat lock-out temperature, the heating mode or cycle is locked out.

U.S. Pat. No. 4,395,886, which is assigned to the same assignee as the present application, discloses a refrigerant charge monitor which detects the temperature differential of the refrigerant fluid on both sides of an expansion valve. While this arrangement is effective for refrigerant charge, it would be desirable to be able to monitor additional critical parameters of the refrigeration system and the load space, all with a single monitoring system.

For example, it would be desirable to be able to monitor transport refrigeration systems while they are operative to insure that when the control of a transport refrigeration system selects a heating or a cooling mode, that the system actually responds and provides heating or cooling, as required, in the cargo space. It would also be desirable to detect a malfunction of a transport refrigeration system which, even though the commanded and actual conditioning modes are consistent, will detect diminished capacity or performance, i.e., loss of efficiency. It would be desirable to detect insufficient refrigerant charge, notwithstanding that there is no malfunction in the control or the individual components of a transport refrigeration system. It would be desirable to detect and to protect the conditioned load against an extended defrost cycle. Finally it would be desirable to detect and protect the refrigerant compressor against situations which may cause damage to the compressor, notwithstanding that the temperature of the conditioned load and the selected set point are consistent.

SUMMARY OF THE INVENTION

Briefly, the present invention relates to new and improved methods and apparatus for monitoring and protecting both a transport refrigeration system and the associated load in the load space to be conditioned by the refrigeration system. The monitoring method and apparatus detects the temperature of the air discharged into the load space by the refrigeration system, and the temperature of the air returning to the refrigeration system from the load space, and develops an algebraic difference signal. The sign of the algebraic difference signal is used to detect improper conditioning modes. When the conditioning mode is found to be correct, the absolute value of the difference signal is used in comparisons with reference values selected according to the position of the selected set point relative to the predetermined heat lock-out temperature.

Detection of an incorrect mode, as well as comparisons which determine that the difference signal does not exceed the selected reference value, initiate a first timing period. The first timing period, if not reset by a subsequent comparison which indicates a return to acceptable performance, will time out and issue a warning signal to the operator of the transport refrigeration system.

The appearance of the warning signal also reduces the magnitude of the reference value which is compared with the difference signal. If, when the warning signal is issued, the actual conditioning mode is not the same as the commanded mode, a second timing period is immediately initiated. If the actual and commanded conditioning modes are consistent, then the second timing period is initiated when a comparison between the difference signal and the smaller reference value finds that the difference signal does not exceed the smaller reference value. If the difference signal does not increase to a value which exceeds the reference value before the second timing period expires, a shut-down signal is provided which shuts down the transport refrigeration system.

Initiation of a defrost cycle resets both timing periods so that the sum of the two timing periods may be used to detect an extended defrost cycle.

A compressor monitoring signal is applied to the monitoring apparatus such that abnormal operation of the compressor will initiate the warning and shut-down timing periods, with return to normal before the second timing period expires, preventing shut-down of the transport refrigeration system.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 3 illustrates a digital algorithm which is useful in describing the operation of the refrigeration system shown in FIGS. 2A and 2B; and FIG. 4 illustrates exemplary temperature differentials which are used as acceptable minimums at various times by the refrigeration monitor shown in FIGS. 2A and 2B.

DESCRIPTION OF PREFERRED EMBODIMENTS

Figure 1:
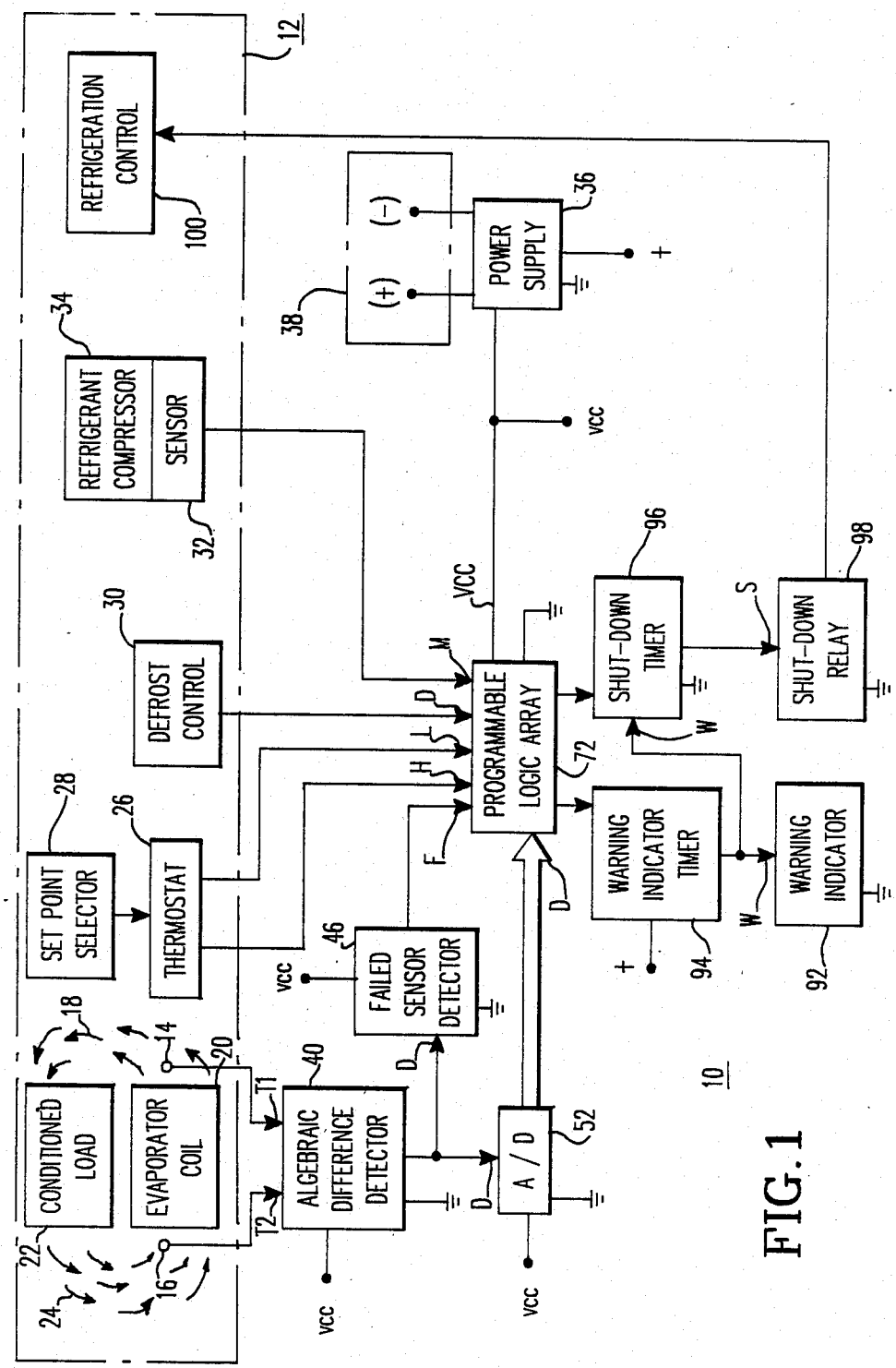
FIG. 1 is a block diagram of a refrigeration system monitor constructed according to the teachings of the invention.

Referring now to the drawings, and to FIG. 1 in particular, there is shown a refrigeration system monitor 10 constructed according to the teachings of the invention, for monitoring a transport refrigeration system 12. U.S. Pat. No. 4,325,224, which is assigned to the same assignee as the present application, discloses in detail a transport refrigeration system of the type which may beneficially utilize monitor 10, and this patent is hereby incorporated into the specification of the present application by reference. Accordingly, only those portions of transport refrigeration system 12 which are necessary in order to understand the present invention are shown in FIG. 1.

Monitor 10 senses the differential evaporator coil to return air temperature of refrigeration system 12, and thus requires first and second external sensors 14 and 16, respectively. Sensors 14 and 16 should have a linear operation over the temperature range of −60 degrees F. to +160 degrees F. and have a suitable ohm to degree change. Honeywell's TD1A, for example, meets the requirements for sensors 14 and 16. The first sensor 14 is disposed to sense the temperature T1 of air 18 discharged from an evaporator coil 20 into a load space 22. The load space 22 contains a load or cargo to be conditioned by refrigeration system 12, which load is in a truck, trailer, or container. Sensor 14 is preferably located in the discharge air stream 18, but may also be disposed in contact with the evaporator coil 20.

The second sensor 16 is disposed to sense the temperature T2 of air 24 returning from the conditioned load space 22 to the evaporator coil 20. Thus, sensor 16 is preferably located directly in a return air duct which directs air 24 from the conditioned load space 22 into the air entry side of evaporator coil 20.

Transport refrigeration system 12 includes a thermostat 26 which senses the temperature of the air in the conditioned load space 22 and it alternates heating and cooling modes to control the air temperature according to the temperature manually selected by a set point selector 28. When the set point selector 28 selects a temperature below a predetermined low value, such as 15 degrees F, for example, the heating mode is automatically locked out by thermostat 26. Below the predetermined lock-out temperature the load 22 will be a frozen load and it is unnecessary to prevent the temperature of the load from falling below the set point temperature. Thermostat 26 provides two signals H and L which are utilized by monitor 10. Signal H is is a logic zero when the thermostat 26 is calling for a cooling mode, and it is a logic one when thermostat 26 is calling for a heating mode. Signal L is a logic zero when the temperature selected by set point selector 28 is above the predetermined heat lock-out temperature, and it is a logic one when the selected set point temperature is at or below the heat lock-out temperature.

Transport refrigeration system 12 also includes defrost control 30 which periodically forces system 12 into a heating mode, to remove frost and ice from the evaporator coil 20. Defrost control 30 provides a signal D which is utilized by monitor 10. Signal D is a logic zero when system 12 is not in the defrosting mode, and a logic one when defrost control 30 is calling for defrost.

Monitor 10 is also arranged to receive a signal M from a sensor 32 which monitors a refrigerant compressor 34 of system 12 to detect an adverse operating condition. Sensor 32, for example, may monitor compressor pressure, temperature, or both. Signal M is a logic zero when no adverse compressor operating condition is detected, and a logic one while an adverse compressor operating condition persists.

Figure 2A:
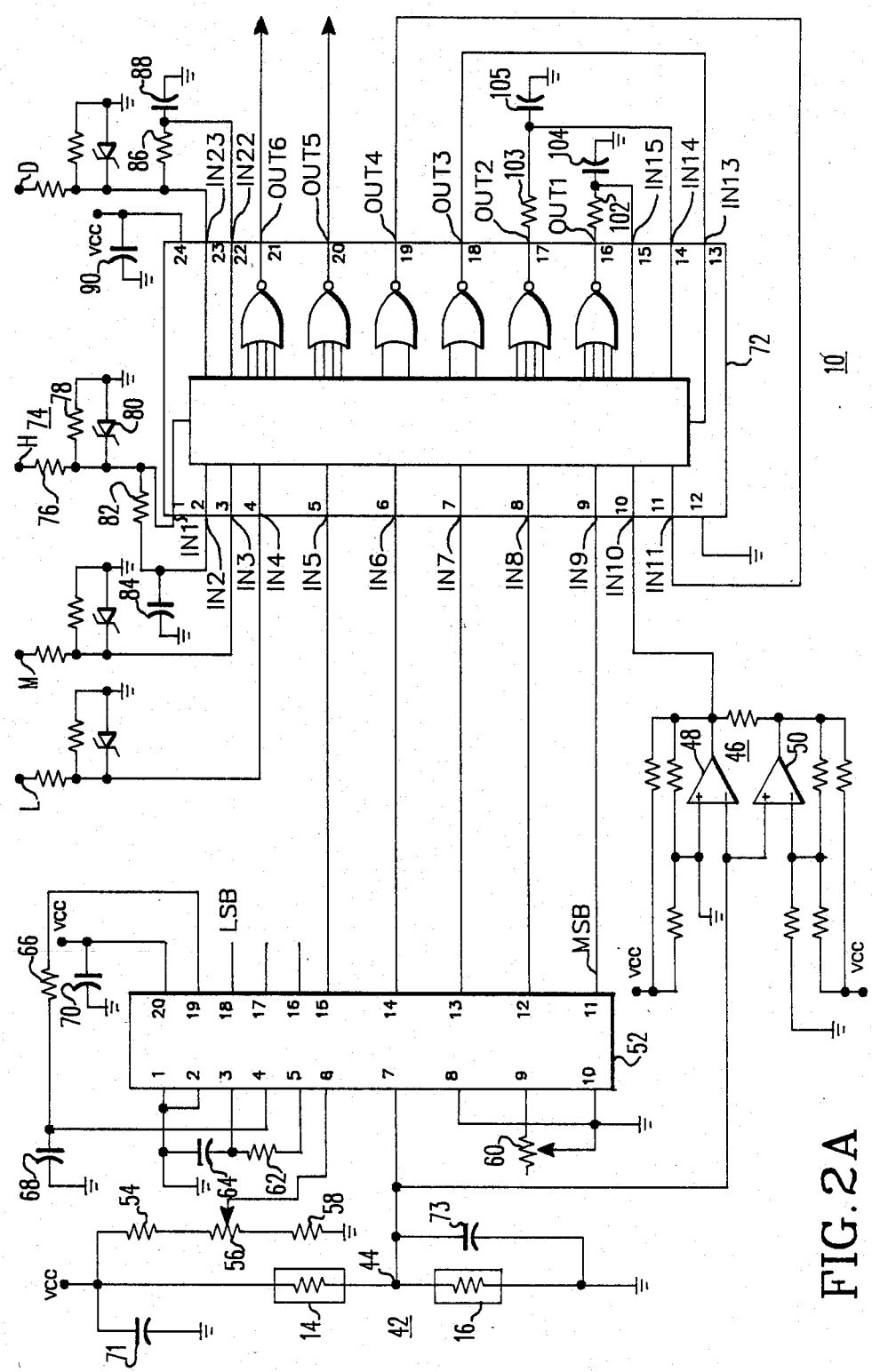
FIGS. 2A and 2B may be assembled to provide a detailed schematic diagram of a preferred implementation of the refrigeration system monitor shown in block form in FIG. 1.
Figure 2B:
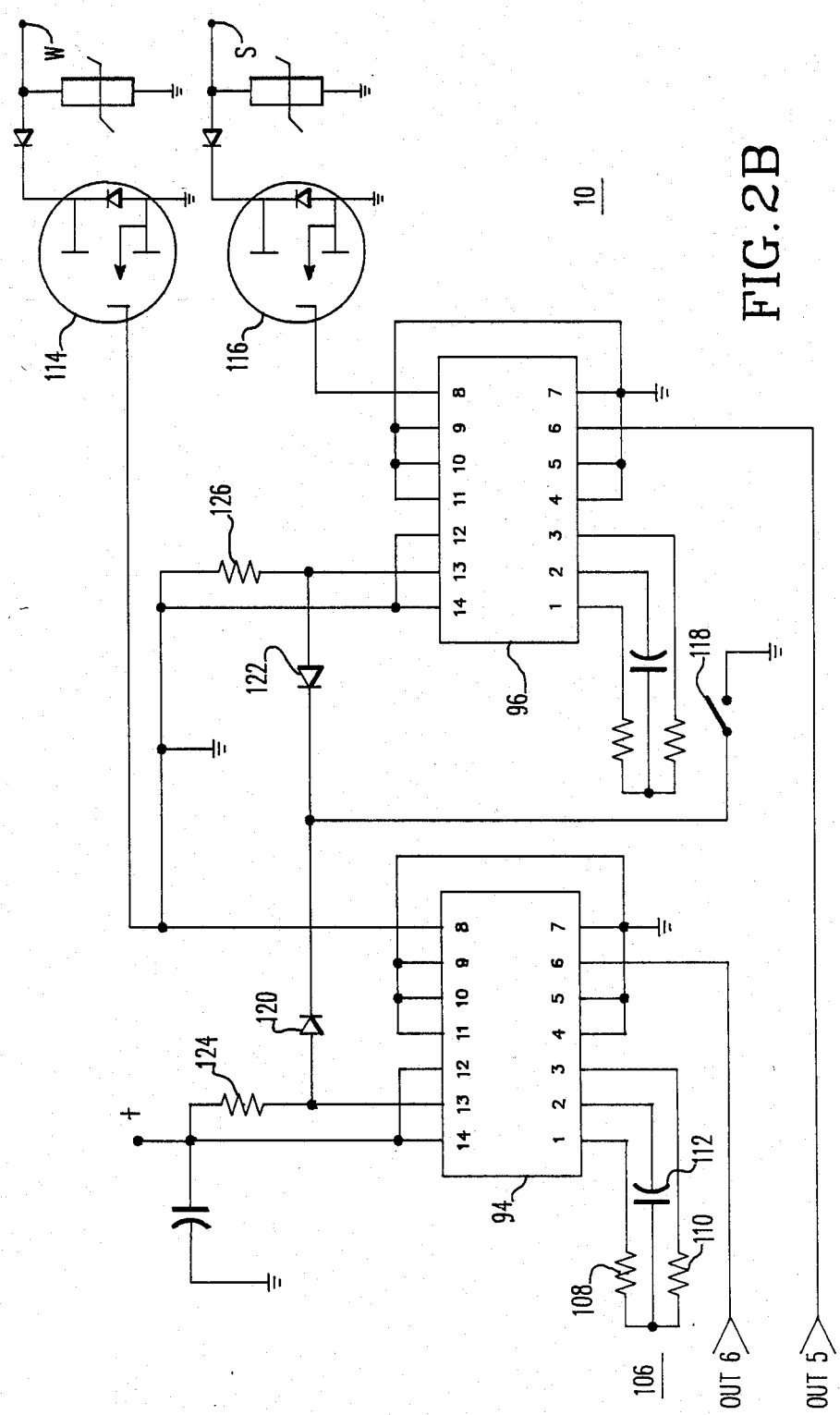

The block diagram of monitor 10 in FIG. 1, and the detailed implementation of monitor 10 set forth in FIGS. 2A and 2B, utilize a programmable logic array, as this is the preferred implementation. However, it is to be understood that a microprocessor or discrete gate logic may be used to implement the logic of the present application, if desired.

As the block diagram of monitor 10 in FIG. 1 is described, the detailed implementation of monitor 10 set forth in FIGS. 2A and 2B will also be referred to.

Operating voltages VCC and (+) for monitor 10 are provided by a power supply 36. Power supply 36 obtains a unidirectional voltage from a power source associated with the transport refrigeration system 12, such as a battery 38. Battery 38 may be a 12 volt battery, for example, with power supply 36 providing regulated and filtered voltages VCC and (+) at appropriate levels, such as five and twelve volts, respectively.

The outputs of the discharge and return air sensors 14 and 16, respectively, are applied to an algebraic difference detector 40 to obtain a differential temperature D equal to the difference between the detected temperatures T1 and T2. For example, as shown in FIG. 2A, sensors 14 and 16 may be serially connected from VCC to ground, to provide a voltage divider with the difference voltage D appearing at the junction 44 between the sensors.

The temperature differential D is applied to a detector 46 which senses when either sensor 14 or 16 fails in an open or a shorted mode. When a failure of either sensor is detected, an output F of detector 46 changes from logic one to a logic zero. As shown in FIG. 2A, the failed detector function 46 may be provided by a pair of operational amplifiers 48 and 50 connected as comparators. Differential voltage D is applied to the inverting input of operational amplifier 48 and to the non-inverting input of operational amplifier 50. If the difference voltage D goes out of the normal range in either the positive or negative direction, the appropriate comparator will switch its output from logic one to a logic zero (ground), and output F will follow.

The difference voltage D is applied to an analog to digital converter (A/D) 52 to change D from an analog value to a digital value. A/D converter 52, as shown in FIG. 2A, may be a ADC0804LCN 8-bit parallel A/D converter in which the analog temperature differential D is applied to input pin 7. The analog input is converted into digital temperature differential D at output pins 11 through 18, with pin 11 being the most significant bit (MSB) and pin 18 being the least significant bit (LSB). The inputs to A/D converter 52 are used as a ratiometric comparator which compares the voltage as a percentage of VCC at pin 7 to fixed VCC voltage percentages at pins 6 (Vin +) and 9 (reference). When both sensors 14 and 16 sense the same temperature, i.e., T1=T2, the voltage at pin 7 (Vin −) will be 50% of VCC. Resistors 54, 56 and 58 form a voltage divider which is adjusted to set the voltage (Vin +) at pin 6 to 52% VCC. Adjustable resistor 60 sets the reference voltage at pin 9 at 2% VCC. The voltage at pin 7 is subtracted from the voltage at pin 6 and the difference is compared with the reference voltage at pin 9. If the voltage at pin 7 is 50% VCC, for example, which will be the case when T1=T2, this is subtracted from the voltage 52% VCC at pin 6. The difference is 2% VCC, which is equal to the reference voltage at pin 9. This arrangement will "center" the conversion at T1−T2=0.

More specifically, A/D converter 52 has 256 output bit combinations at pins 11 through 18. The analog ratiometric inputs of the A/D converter 52 are such that when the voltage at pin 7 is 50% VCC, A/D converter 52 will be halfway through the conversion, i.e., at bit #128. This is illustrated in FIG. 3, which is a digital algorithm of A/D converter 52, with bit #128 indicating a differential temperature difference D equal to 0 degrees F. The digital algorithm of FIG. 3 indicates D=T1−T2. Thus, when the temperature T1 of the discharge air is colder than the temperature T2 of the return air, indicating a cooling mode, D will have a negative sign (−). When the temperature T1 of the discharge air is warmer than the temperature of the return air T2, indicating a heating mode, the sign of D will be positive (+). If the voltage at pin 7 is 52% VCC, the digital output of D/A converter 52 will be at bit 256, and when the voltage at pin 7 is 48% VCC, the digital output will be at bit 0. The inputs to A/D converter 52 are scaled for a one bit output change for a temperature change at either sensor of ±0.2 degrees F. This gives monitor 10 the capability of detecting sensor differential temperatures D of up to ±51.2 degrees F.

Pins 1 and 2 of A/D converter 52 are microprocessor interface pins, and are thus grounded. Resistor 62 and capacitor 64 are connected to provide an RC time delay upon power-up, to start the analog to digital conversion properly by maintaining pins 3 and 5 at ground until the RC time delay times out. The self clocking rate at which A/D converter 52 updates the digital output is controlled by the values of resistor 66 and capacitor 68, connected to pins 4 and 19. VCC is connected to pin 20, with capacitor 70 being a filter capacitor. Capacitors 71 and 73 compensate for the inductance of the relatively long leads to sensors 14 and 16, respectively.

The digital output D provided by A/D converter 52 is applied to a programmable logic array 72, which, as shown in FIG. 2A, is a P.A.L. 16L6 in this embodiment, having 16 inputs and 6 outputs. The heat lock-out signal L, the compressor malfunction signal M, the heat signal H, the defrost signal D, and the failed sensor input F, are also applied to inputs of logic array 72.

As shown in FIGS. 2A and 3, the five most significant bits of digital signal D are applied to inputs IN5 through IN9 of logic array 72, with the MSB being applied to input IN9.

External inputs L, M, H and D are brought into monitor 10 by external relay contact closures to the unit's 12 volt battery 38, which signal is reduced to a compatible 5 volt signal by a voltage divider and a Zener diode network, such as voltage divider 74 comprising resistors 76 and 78, and Zener diode 80, which reduce signal H to 5 volts.

Signal H is applied directly to input IN1 of logic array 72, and to input IN2 via an RC time delay comprising resistor 82 and capacitor 84. Signals M, L and F are applied to inputs IN3, IN4 and IN10, respectively. Signal D is applied directly to input IN23, and to input IN22 via an RC time delay comprising resistor 86 and capacitor 88. Pin 12 of logic array 72 is grounded, and pin 24 is connected to VCC, with capacitor 90 being a filter capacitor.

Output OUT1 of logic array 72 is programmed to switch from high (logic one) to low (logic zero or ground) whenever the differential temperature D is not great enough under the existing circumstances to indicate efficient operation. For example, insufficient refrigerant charge may make it impossible for the transport refrigeration system 12 to develop a differential D of the desired magnitude.

As will be hereinafter explained in greater detail, it is the function of monitor 10 to first provide a warning indication, indicated by warning indicator 92 in FIG. 1, in response to a signal W which is provided after a predetermined time delay starting when monitor 10 first detects marginal or inefficient operation. The time delayed signal W is provided by a warning indicator timer 94. After warning signal W is provided, a second timer 96 is enabled. Timer 96, after enablement, will be activated by differential D falling below a magnitude selected according to the smallest differential D at which it would be desirable for refrigeration system 12 to continue operation. If differential D continues below this smallest threshold level for a predetermined period of time, timer 96 will time out and provide a true signal S which actuates a shut-down relay 98. Shut-down relay 98 has contacts in refrigeration control 100, to shut down transport refrigeration system 12 before the conditioned load is undesirably frozen or cooked, or before the compressor is damaged, as the case may be. It is thus the function of monitor 10 to monitor the existing conditions of the transport refrigeration system 12, and to select reference levels for comparison with differential signal D which are compatible with the existing conditions, in order to intelligently provide a warning signal W for the operator, and a shut-down signal S for the control 100 of the transport refrigeration system 12.

FIG. 4 is a chart which lists exemplary reference levels V1 and V2 for the warning indicator and shut-down references associated with the activation of timers 94 and 96, respectively. Each reference V1 and V2 has two levels according to whether or not the set point temperature selected by set point selector 28 is above or below the heat lock-out value, which may be 15 degrees, for example. The function of the heat lockout input L is associated with the fact that a refrigeration system has a higher capacity and a larger temperature differential D when controlling to warmer temperatures. Capacity and the differential D decrease at lower load temperatures. The purpose of the heat lockout input L is thus to establish a lower acceptable differential D when operating at lower load temperatures. Exemplary values for V1 for set points above and below heat lock out are 6.8 and 3.4 degrees F., respectively. Thus, when the differential temperature D falls below 6.8 and the set point is above heat lock out, timer 94 will be activated. If the differential temperature D remains below 6.8 until timer 94 times out, signal W will switch true, activating warning indicator 92, such as by energizing an indicator light. Signal W will also enable shut-down timer 96. If the selected set point temperature is below heat lock out, this sequence of events will not be initiated until D falls below 3.4 degrees F.

Once warning signal W is provided and shut-down timer 96 enabled, a continued drop in efficiency is required to activate timer 96. For example, as shown in FIG. 4, if the selected set point is above heat lock out, D will have to drop below 3.4 degrees F to activate timer 96. If the selected set point is below heat lock out, D will have to drop below 1.7 degrees F. to activate timer 96.

With this broad description of reference levels for differential signal D in mind, output OUT1 is programmed to go true (low) according to the following Boolean equation:

OUT1 = /IN9 * IN8 * IN7 * /IN4 +

IN9 * /IN8 * /IN7 * /IN4 +

/IN9 * IN8 * IN7 * IN6 * IN4 +

IN9 * /IN8 * /IN7 * /IN6 * IN4

(* indicates AND, + indicates OR and / indicates a NOT or low input)

The first line of the equation will cause output OUT1 to go low when IN4 (signal L) is low, indicating a set point above heat lock out, and D is in the range from 0 to −6.8, indicated by IN9 having a low input and IN8 and IN7 having high inputs, as shown in the digital algorithm of FIG. 3. Thus, since the set point is above heat lock out and D does not exceed 6.8 degrees F., it indicates inefficient operation, and OUT1 will switch from high to low. In like manner, the second line of the equation indicates OUT1 will switch low when D is in the range from 0 to +6.8 degrees F and the set point is above heat lock out.

The third and fourth lines will cause OUT1 to switch low when the selected set point is below heat lock out and D does not exceed 3.4 degrees F. The third line controls when D is in the range from 0 to −3.4, and the fourth line controls when D is in the range from 0 to +3.4.

OUT1 of array 72 is connected to input IN15, and will be used in another Boolean equation. If OUT1 is low, RC network comprising resistor 102 and capacitor 104 will hold it low during an A/D bit transition.

Output OUT2 of array 72 is programmed to go low whenever the transport refrigeration system 12 cycles between heating and cooling modes, and is used to initiate reset of shut-down timer 96. If refrigeration system 12 is not stuck in any one mode, and is cycling within the time-out period of timer 96, the system 12 will not be shut down by monitor 10, as each time the refrigeration system 12 switches from heating to cooling, or from cooling to heating, output OUT2 will go low to trigger reset of timer 96. Output OUT2 is connected to input IN14 of array 72, and input IN14 is used in the Boolean equation for output OUT5. OUT5 is connected to the run/reset pin of timer 96.

The Boolean equation for OUT2 is as follows:

OUT2 = /IN1 * /IN2 * /IN9 * IN8 * IN7 * IN6 * /IN4 +

IN1 * IN2 * IN9 * /IN8 * /IN7 * /IN6 * /IN4 +

/IN1 * /IN2 * /IN9 * IN8 * IN7 * IN6 * IN5 * IN4 +

IN1 * IN2 * IN9 * /IN8 * /IN7 * /IN6 * /IN5 * IN4

Inputs IN1 and IN2 receive the heat signal H. When signal H makes the transition from low to high, IN1 will follow without delay while IN2 will follow with an RC time delay. This will make the IN1 and IN2 inputs momentarily equal to IN1 * /IN2 which will generate a pulse at output OUT5, clearing and resetting timer 96. The same function will occur when the heat input goes low, with the RC time constant holding IN2 momentarily high and the momentary logic will be /IN1 * IN2, again generating a pulse at output OUT5.

OUT2 is also programmed to go low when differential signal D does not exceed the applicable reference value V2 as hereinbefore explained relative to OUT1 and reference value V1.

OUT2 of array 72 is connected to input IN14, and will be used in another Boolean equation. If OUT2 is low, RC network comprising resistor 103 and capacitor 105 will hold it low during an A/D bit transition.

If the actual or detected conditioning mode of the transport refrigeration system 12 is not consistent with the commanded mode as evidenced by the logic level of signal H, the warning and shut-down timing sequences will be initiated as hereinbefore described without regard to the magnitude of the differential signal D. In other words, the sign of signal D is checked for consistency with the commanded mode, as one way to initiate the timing sequences. When the sign of D is consistent with the commanded mode, then the absolute magnitude of D becomes important in determining whether or not to initiate the warning and shut-down timing sequences. Output OUT3 is programmed to go low in the event the actual conditioning mode is not consistent with the commanded mode, with the Boolean equation for OUT3 being as follows:

OUT3 = /IN9 * IN1 * /IN4 + IN9 * /IN1

Input IN9 is the MSB of differential signal D. When the commanded conditioning mode is calling for cooling, i.e., signal H (IN1) is low, input IN9 should be 0, as indicated in FIG. 3. If not, the second line of the Boolean equation will cause OUT3 to go low.

When the commanded conditioning mode is calling for heating, i.e., signal H is high, input IN9 should be high. If not, and the selected set point is above heat lock out (signal L and IN4 will be low), the first line of the Boolean equation will cause OUT3 to go low. It will be noted that when the commanded conditioning mode is calling for heat and heat is locked out, monitor 10 recognizes that the system is operating efficiently even though the commanded and actual conditioning modes are inconsistent.

Output OUT4 is programmed to go low when the defrost input signal D makes a transition from low to high, which indicates the transport refrigeration system is switching to a defrost mode. The equation for OUT4 is as follows:

OUT4 = IN23 * /IN22

Inputs IN23 and IN22 are the defrost inputs to array 72. Output OUT4 is connected to input IN11 of array 72, and is used in the equations for OUT5 and OUT6 to clear and reset the warning indicator timer 94 and the shut-down timer 96, so the that the sum of the their predetermined timing periods can be used to detect an extended defrost cycle. If the defrost cycle persists for the combined total of the two timing periods, then system 12 will be shut down, as the conditioned load 22 would otherwise cook. This assumes that when defrost is initiated the system is operating in the cooling mode. If defrost should be initiated when the system is in the heating mode, the monitor will indicate proper operation until the thermostat reverts to the cooling mode. When system 12 switches to defrost, signal D will go high, IN23 will immediately follow, and IN22 will follow after an RC time delay. This momentarily causes the logic IN23 * /IN22, generating pulses at outputs OUT5 and OUT6.

Output OUT6 controls timer 94. When OUT6 is low, timer 94 will be active. When OUT6 switches high, timer 94 will clear and reset. The Boolean equation for OUT6 is as follows:

$$OUT6 = /IN15 * IN10 * IN11 +$$
$$/IN13 * IN10 * IN11 +$$
$$IN3 * IN11$$

OUT6 will go low to start timer 94 when differential signal D does not exceed the applicable threshold value V1 (IN15 is low), and both sensors 14 and 16 are operating properly (signal F and IN10 are high), and the defrost inputs are not in the transition state of low to high (IN11 high). OUT6 will also go low when the sensors are operating properly, defrost is not in the transition of low to high, and the detected conditioning mode is inconsistent with the commanded mode H (IN13 low). OUT6 will also go low when defrost is not in the transition of low to high and the compressor malfunction signal M goes high to indicate the detection of abnormal compressor operation.

Output OUT5 controls timer 96. When OUT5 is low, timer 96 will be active if timer 96 has been enabled by timer 94. When OUT5 switches high, timer 96 will clear and reset. The Boolean equation for OUT5 is as follows:

$$OUT5 = /IN14 * IN10 * IN11 +$$
$$/IN13 * IN10 * IN11 +$$
$$IN3 * IN11$$

In the following description it will be assumed that timer 94 has timed out, enabling timer 96. OUT5 will go low to start timer 96 when differential signal D does not exceed the applicable threshold value V2 (IN14 is low), and both sensors 14 and 16 are operating properly (signal F and IN10 are high), and the defrost inputs are not in the transition state of low to high (IN11 high). OUT5 will also go low when the sensors are operating properly, defrost is not in the transition of low to high, and the detected conditioning mode is inconsistent with the commanded mode H (IN13 low). OUT5 will also go low when defrost is not in the transition of low to high and the compressor malfunction signal M goes high to indicate the detection of abnormal compressor operation. If timer 94 has not timed out, a low OUT5 existing when timer 94 times out will immediately start timer 96.

As shown in FIG. 2B, timers 94 and 96 are LM4541BC programmable timers. Since each timer 94 and 96 is the same, only timer 94 will be described in detail. Timer 94 has an internal 16-stage binary counter that will count the pulses generated by an oscillator 106. Oscillator 106 is formed by resistors 108 and 110 and capacitor 112, which are connected to pins 1, 2 and 3 of timer 94. Pins 12 and 13 of timer 94 determine at what count output pin 8 will go high. The timers are set for a normal time count of 65,536 pulses (pins 12 and 13 both high).

For purposes of example, timers 94 and 96 are both set to time out after the input pin 6 has been held low for 45 minutes, but other timing periods may be selected. The sum of the two timing periods should be greater than the longest normal defrost cycle, in order to detect an abnormal defrost period.

Output pins 8 of timers 94 and 96 are connected to relay drivers 114 and 116, respectively, such as IRFD220 N-channel Hexfets. Relay drivers 114 and 116 provide true signals W and S, respectively, when their associated timer times out.

Fast-time bench testing is provided by grounding input pins 13 with switch 118. When switch 118 is closed, pin 13 will be low and pin 12 high, which will change the count at which pin 8 goes high from 65,536 to 256. Diodes 120 and 122 are blocking diodes, to prevent timers 94 and 96 from interfering with one another. Resistors 124 and 126 are used for current limiting.

In summary, there has been disclosed a new and improved monitor 10 for a transport refrigeration system 12 which will monitor and protect both the load 22 to be conditioned and the compressor 34 of the transport refrigeration system 12. Monitor 10 will detect an incorrect conditioning mode, i.e., when the system becomes stuck in a heating or cooling while the control is commanding the opposite mode. Monitor 10 will detect inefficient operation, utilizing different threshold values for comparison with the evaporator coil to return air differential D, depending upon whether the load is a frozen or a perishable load, and depending upon whether the length of time the inefficient operation has persisted is within a first timing period, or has extended beyond the first timing period into a second timing period. Finally, monitor 10 will first provide a warning signal W to give an opportunity for human intervention before a subsequent shut-down signal S is generated. Shut-down signal S, when generated, automatically shuts down the transport refrigeration system 12.

I claim as my invention:

1. A method of monitoring and protecting a transport refrigeration system and a load in a load space to be conditioned by the transport refrigeration system, with the transport refrigeration system having a selectable set point temperature for the load space which is maintained by heating and cooling modes, comprising the steps of:

providing a signal H indicative of whether the refrigeration system is in a heating or a cooling mode,
  locking out the heating mode when the set point temperature selected is below a predetermined temperature,
  detecting the temperature T1 of air discharged from the refrigeration system into the load space,
  detecting the temperature T2 of air returning to the refrigeration system from the load space,
  providing a difference signal D equal to the difference between T1 and T2, preserving the sign of the difference,
  determining if the sign of D is consistent with signal H,
  activating a first timer when the sign of D is not consistent with signal H,
  selecting a first reference value V1 having a magnitude responsive to whether or not the heating mode has been locked out, with the first reference value V1 being indicative of a warning threshold value for D, below which a warning signal W may be provided,
  determining if D exceeds the first reference value V1 when the sign of D is consistent with signal H,
  activating the first timer when D does not exceed the reference value V1,
  resetting the first timer in response to D exceeding the reference value V1, and providing the warning signal W in response to the first timer being continuously active for a first predetermined period of time.

2. The method of claim 1 including the steps of:

activating a second timer in response to the warning signal W when the sign of D is inconsistent with signal H, selecting a second reference value V2 having a magnitude responsive to whether or not the heating mode has been locked out, with the second reference value V2 being indicative of an acceptable minimum value for D, below which a shut-down signal S may be provided, determining if D exceeds the second predetermined value V2 after the warning signal W has been provided, when the sign of D is consistent with signal H, activating the second timer when D does not exceed V2, resetting the second timer in response to D exceeding V2, and providing the shut-down signal S in response to the second timer being continuously active for a second predetermined period of time.

3. The method of claim 2 wherein the first and second predetermined periods of time are equal to one another.

4. The method of claim 1 wherein the step of selecting the first reference value V1 provides a larger value when the heating mode is not locked out than the value provided when the heating mode is locked out.

5. The method of claim 2 wherein the second reference value V2 is smaller than the first reference value V1, and wherein the step of selecting the second reference value V2 provides a larger value when the heating mode is not locked out than the value provided when the heating mode is locked out.

6. The method of claim 1 including the steps of:

detecting when a transition occurs between heating and cooling modes, and resetting the first timer in response to the detecting step detecting such a transition.

7. The method of claim 2 including the steps of:

initiating a defrost cycle periodically, notwithstanding the refrigeration system being in the cooling mode, selecting the first and second predetermined periods of time such that their sum exceeds the normal length of the defrost cycle, and resetting the first and second timers in response to the step of initiating a defrost cycle, wherein the shutdown signal S will be provided in the event the defrost cycle is abnormally extended.

8. The method of claim 1 wherein the transport refrigeration system includes a compressor, and including the steps of:

monitoring the compressor for abnormal operation, providing a signal M in response to detection of abnormal operation of the compressor, and activating the first timer in response to signal M being provided.

9. The method of claim 2 wherein the transport refrigeration system includes a compressor, and including the steps of:

monitoring the compressor for abnormal operation, providing a signal M in response to detection of abnormal operation of the compressor, activating the first timer in response to signal M being provided, and activating the second timer when signals W and M coexist.

10. Apparatus for monitoring and protecting a transport refrigeration system and a load in a load space to be conditioned by the transport refrigeration system, with the transport refrigeration system having a selectable set point temperature for the load space which is maintained by heating and cooling modes when the selected set point is above a predetermined temperature, and wherein the heating mode is cut out when the selected set point is at or below the predetermined temperature, comprising:

means detecting the temperature T1 of air discharged from the refrigeration system into the load space, means detecting the temperature T2 of air returning to the refrigeration system from the load space, means providing a signal D equal to the algebraic difference between T1 and T2, means providing a signal indicative of the current conditioning mode of the transport refrigeration system, means determining if the sign of the algebraic difference signal D is consistent with the current conditioning mode of the transport refrigeration system, first timing means, means activating said first timing means when the sign of the algebraic difference signal D is not consistent with the current conditioning mode of the transport refrigeration system, means providing a signal indicative of whether of not the heating mode of the transport refrigeration system is locked out, means selecting a first reference value V1 having a magnitude responsive to whether or not the heating mode has been locked out, with the first reference value V1 being indicative of a warning threshold value for D, below which a warning signal W may be provided, means comparing the absolute magnitude of the algebraic difference signal D with the first reference value V1 when the sign of the algebraic difference signal D is consistent with the current conditioning mode of the transport refrigeration system, means activating the first timing means when D does not exceed the reference value V1, means resetting the first timing means in response to D exceeding the reference value V1, and means providing the warning signal W in response to the first timing means being continuously active for a first predetermined period of time.

11. The apparatus of claim 10 including:

second timing means, means activating said second timing means in response to the warning signal W when the sign of D is inconsistent with the current conditioning mode of the transport refrigeration system, means selecting a second reference value V2 having a magnitude responsive to whether or not the heating mode is locked out, with the second reference value V2 being indicative of an acceptable minimum value for D, below which a shut-down signal S may be provided, means comparing the absolute magnitude of the algebraic difference signal D with the second predetermined value V2 after the warning signal W has been provided, when the sign of D is consistent with the current conditioning mode of the transport refrigeration system, means activating said second timing means when D does not exceed the reference value V2, means resetting the second timing means in response to D exceeding the reference value V2, and means providing the shut-down signal S in response to the second timing means being continuously active for a second predetermined period of time.

12. The apparatus of claim 11 wherein the first and second predetermined periods of time are equal to one another.

13. The apparatus of claim 10 wherein the means selecting the first reference value V1 provides a larger value when the heating mode is not locked out than the value provided when the heating mode is locked out.

14. The apparatus of claim 11 wherein the second reference value V2 is smaller than the first reference value V1, and wherein means selecting the second reference value V2 provides a larger value when the heating mode is not locked out than the value provided when the heating mode is locked out.

15. The apparatus of claim 10 including:

means detecting when a transition occurs between heating and cooling modes, and means resetting the first timing means in response to the detection of such a transition.

16. The apparatus of claim 11 including:

means initiating a defrost cycle periodically, notwithstanding the refrigeration system being in the cooling mode, and means resetting the first and second timers in response to the step of initiating a defrost cycle, wherein the shutdown signal S will be provided in the event the defrost cycle extends beyond the sum of the first and second predetermined periods of time.

17. The apparatus of claim 10 wherein the transport refrigeration system includes:

a compressor, means monitoring the compressor for abnormal operation, means providing a signal M in response to detection of abnormal operation of the compressor, and means activating the first timing means in response to signal M being provided.

18. The apparatus of claim 11 wherein the transport refrigeration system includes:

a compressor, means monitoring the compressor for abnormal operation, means providing a signal M in response to detection of abnormal operation of the compressor, means activating the first timing means in response to signal M being provided, and means activating the second timing means when signals W and M coexist.

* * * * *